United States Patent [19]
Coscia

[11] 3,801,251
[45] Apr. 2, 1974

[54] COMBINATION OF A PRESS FOR MOULDING PLASTIC MATERIALS, RUBBER AND THE LIKE AND A CLEANING DEVICE INCORPORATED INTEGRALLY IN THE PRESS

[75] Inventor: Giovanni A. Coscia, Malnate, Italy

[73] Assignee: Societe Genetale Conseil SO.GE. Co., Zurich, Switzerland

[22] Filed: July 14, 1971

[21] Appl. No.: 162,416

[30] Foreign Application Priority Data
July 24, 1970 Italy .................................. 27839/70

[52] U.S. Cl. .................. 425/229, 15/21 R, 425/406
[51] Int. Cl. ............................................. B29c 3/00
[58] Field of Search ........... 425/227, 228, 229, 225, 425/226, 406; 15/21, 55

[56] References Cited
UNITED STATES PATENTS
2,727,263  12/1955  Dangremond et al. .................. 15/55
2,869,159  1/1959  Kershaw .................................. 15/55
3,230,561  1/1966  Taccone .......................... 15/21 R X
3,421,168  1/1969  Bartel ................................. 15/21 R
3,248,762  5/1966  Wagner .......................... 425/229 X FOREIGN PATENTS OR APPLICATIONS
269,721  4/1927  Great Britain ..................... 425/229

Primary Examiner—Robert L. Spicer, Jr.
Attorney, Agent, or Firm—Owen, Wickersham & Erickson

[57] ABSTRACT

An improved press for moulding plastic materials, rubber and the like comprising a device for removing residual material adhering to the mould surface. Said device comprises a rotating brush provided with displacement means allowing the brush to be horizontally and vertically moved in synchronism with the movement of the moulding press.

6 Claims, 2 Drawing Figures

INVENTOR
GIOVANNI A COSCIA

COMBINATION OF A PRESS FOR MOULDING PLASTIC MATERIALS, RUBBER AND THE LIKE AND A CLEANING DEVICE INCORPORATED INTEGRALLY IN THE PRESS

BACKGROUND OF THE INVENTION

The present invention relates to an improved press for moulding plastic materials, rubber and the like, and in particular to a device which, when mounted on the press, automatically cleans the press mould.

It is known that the moulding presses used at present suffer from the serious drawback that the mould surface during the operation of the press is subject to the adhesion thereto of residues from the material being treated. As the press operates automatically, this results in faulty pieces which have to be rejected, with a consequent economic loss.

Some attempts at obviating this drawback have already been made. For instance a device is known consisting of a guillotine-like blade which moves downwards along the mould and removes therefrom the material residues, which have adhered thereto. All the known devices of this kind and in particular also the above-mentioned guillotine device are not completely satisfactory as the mould surface has recesses thereon which are not accessible for rigid bodies moving with a motion of translation opposite the mould surface.

SUMMARY OF THE INVENTION

It has now been conceived as the object of the present invention a device which, when mounted on a moulding press of any type, automatically and completely cleans the mould surface. This device consists substantially of a rotating brush the movements of which are synchronized with those of the moulding press. Such a device has the advantage that it automatically accomplishes a quick and complete cleaning of the surface of the press mould, whatever the depth of the impressions of the mould may be.

A further advantage offered by the device according to the present invention resides in that the device can be advantageously used as an ejector for special moulded pieces, such as O rings.

As it is known, these rings once the moulding operation is accomplished remain with their half within one of the two mould elements.

BRIEF DESCRIPTION OF THE DRAWINGS

These and further advantages and features of the present invention will be apparent to those skilled in the art from the following detailed description of an embodiment thereof with reference to the accompanying drawings in which.

DETAILED DESCRIPTION OF THE PREFERRED EMBODIMENT

Figure 1:
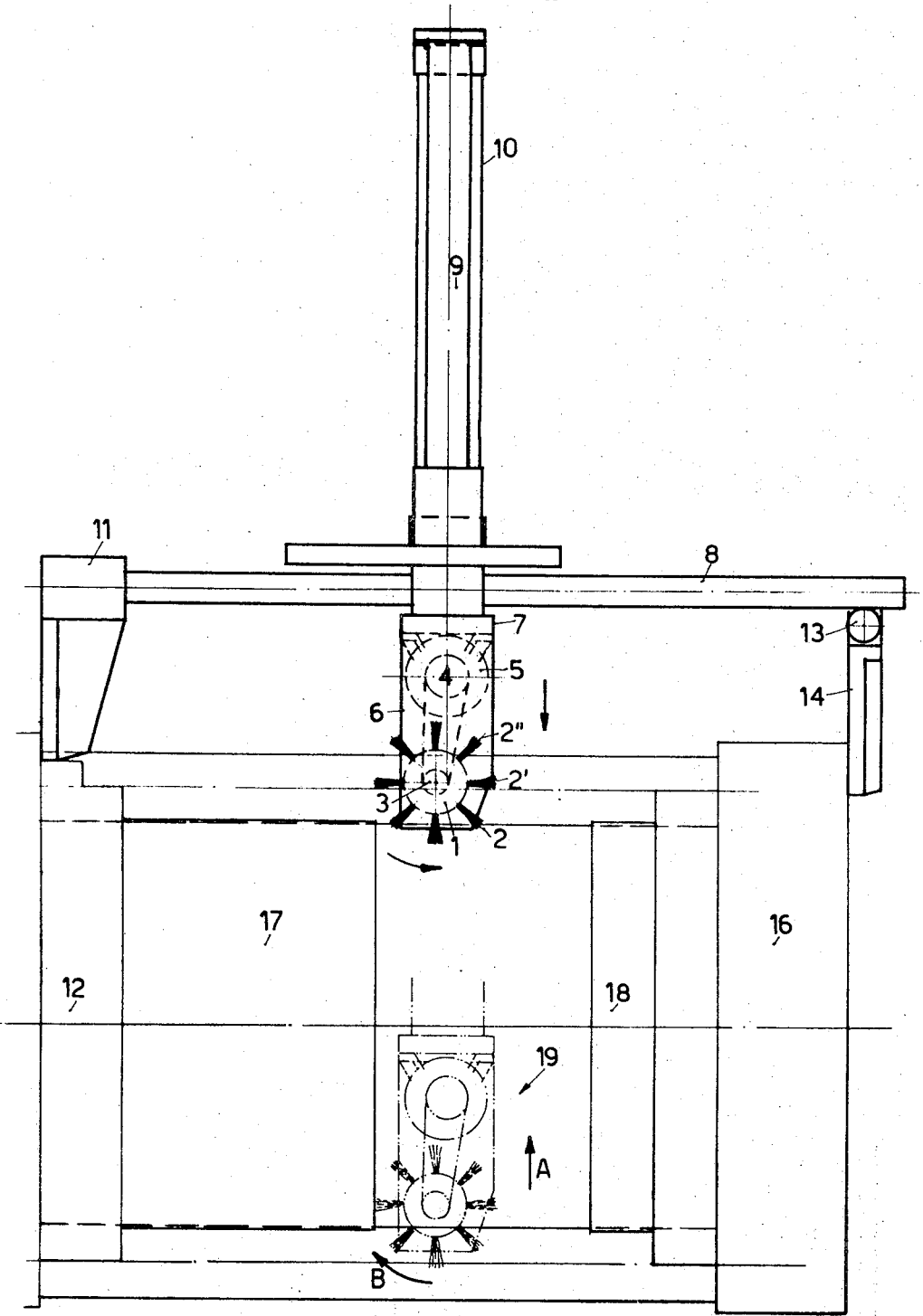
FIG. 1 shows a side elevation view of a device according to the present invention.

Referring now to FIG. 1 there may be seen that the device according to the present invention comprises a rotating brush 1 carrying on its periphery a plurality of parallel rows of bristle groups 2, 2', 2" etc. The brush 11 is connected with a shaft 4 of a motor 5 by means of a pulley 3. The motor 5 which may be an electric, pneumatic or hydraulic type motor rotates the brush 1 as required. The pin ends of the brush 1 and shaft 4 of the motor 5 are supported by the support uprights 6 and 6' (better illustrated in FIG. 2) by means of bearings.

The uprights 6 and 6' are connected together by means of a plate 7 to which the motor 5 may be suitably secured? The plate 7 has two horizontal parallel holes for letting through a pair of slide guides 8 and 8'. Sliding along these guides, for instance by hand drive, the rotating brush can be positioned at the most suitable distance with respect to the surface of the press mould. The vertical positioning of the rotating brush 1 with respect to the mould occurs by sliding along the guide columns 9 and 9'. The drive necessary for such movement may be provided by means of a pneumatic or hydraulic cylinder 10. The driving means of cylinder 10 are suitably connected to those of the moulding press so that the downward and upward displacement of the rotating brush 10 occurs at the very movement when the mould is open.

The guides 8 and 8' are mounted on a support 11 which is to be secured to the movable plane 12 of the press. The opposite end of guides 8 and 8' is supported by a pair of rollers 13 supported by the plate 14 which is to be applied on the stationary plane 16 of the press. In FIG. 1 there are also schematically shown the two parts which form the press mould, i.e. the mould bottom 17 and the cover 18. In said figure there is also illustrated in broken lines the position 19 where the brush 1 arrives after reaching its bottom dead centre. The arrow A shows the ascent movement of the rotating brush, its direction of rotation being shown by the arrow B.

Figure 2:
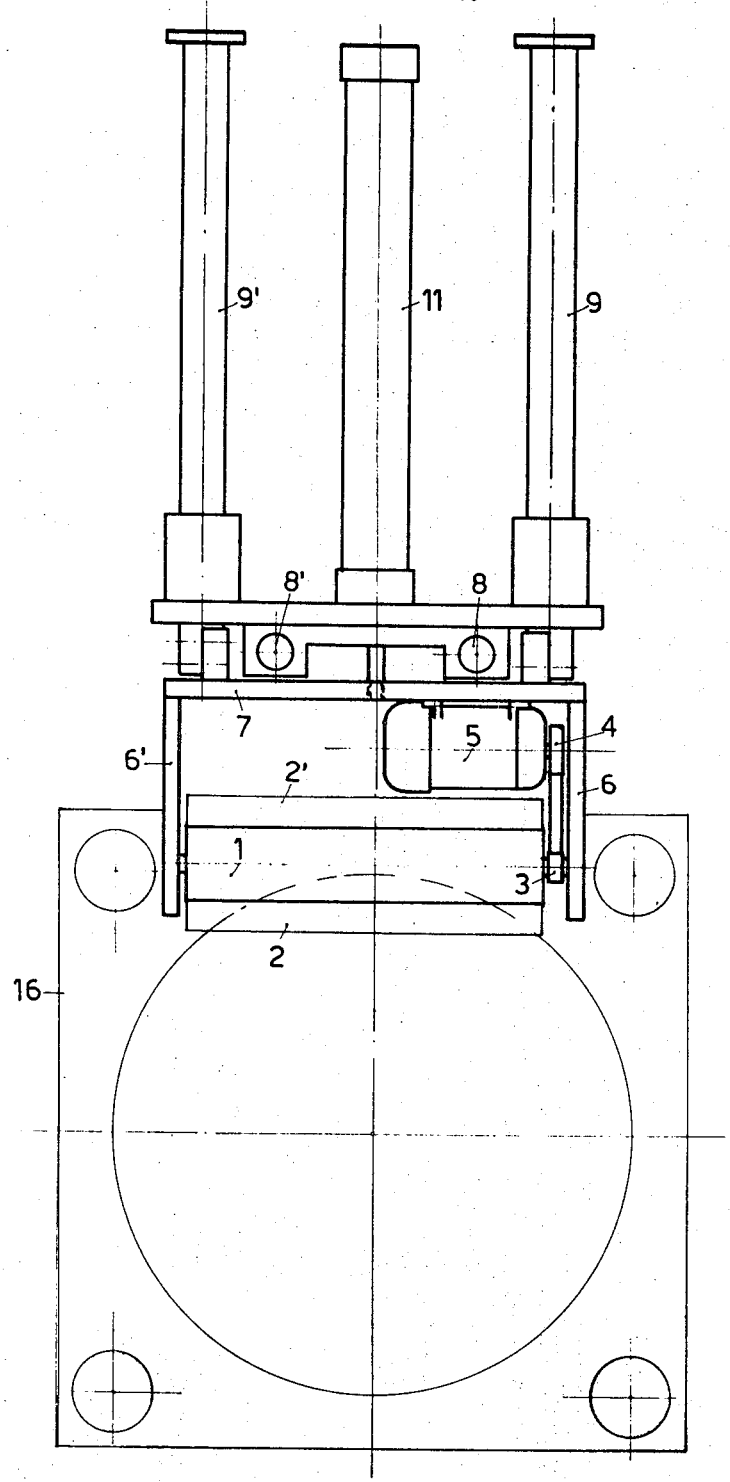
FIG. 2 shows a front elevation view of the device shown in FIG. 1.

Referring now to FIG. 2 in which like numerals refer to like parts illustrated in FIG. 1, there may be seen under a different angle the device shown in FIG. 1. The brush 1 which may be a metal body having a cylindrical or a prismatic form carries on its periphery a plurality of parallel rows of bristle groups 2, 2', 2" etc. These rows of bristles are suitably spaced one from the other so that a piece separated from the mould to which it adhers cannot be projected laterally and therefore far from the control photo-cell of the moulding press. Tests have shown that the angular distance between the bristle rows should be in the range from 30° to 60°, preferably from 40° to 50°.

The bristles, which are grouped and arranged so as to form parallel rows, may be formed of any suitable material, even a metal material provided that it does not spoil the moulds. However, bristles of plastic material, such as a polyamide or polyolefine plastic material are preferred. The length of the bristles must be at least 10 mm. Smaller lengths considerably reduce the functionality of the device. The high limits of the bristle length are selected according to the diameter and the rigidity of the bristles as well on the basis of other practical considerations apparent to those skilled in the art. Other additions and/or modifications to the device hereinbefore described and illustrated will also be apparent to those skilled in the art. The embodiment hereinbefore described and illustrated in the accompanying drawings has been given only as an example and in no way limits the scope of the invention.

What is claimed is:

1. An improved press for moulding plastic materials, rubber and the like, comprising two mould halves, one half being movable in a variable plane and the other mould half lying in a stationary plane, a device integral with said press mould and movable with respect thereto for removing residual material adhering to the surface of said press moulds, said device comprising a rotating brush and displacement means for the brush and movable in two perpendicular directions for allowing the horizontal and vertical displacement of the brush and also movement of the brush in a direction which is a resultant of said horizontal and vertical displacement in synchronism with the movements of the movable plane of the moulding press to thereby permit the rotating brush to reach every point of the mould cavity, said displacement means comprising a horizontal guide which is laterally offset from said planes and which extends in the direction parallel to the direction of movement of the movable plane, and a support supporting the ends of the brush for rotation within the support and including a guide connection connecting the support to the horizontal guide.

2. A press according to claim 1, wherein the displacement means include a pair of guide columns and a vertical drive cylinder connected to said support and wherein the driving means of the vertical drive cylinder are synchronized with those of the moulding press.

3. A press according to claim 1, wherein the rotating brush comprises bristles having a length amounting to at least 10 mm and arranged in groups forming parallel rows which are spaced one from the other.

4. A press according to claim 3, wherein the rows of bristle groups are spaced one from the other by an angular distance in the range from 30° to 60°.

5. A press according to claim 1 wherein said horizontal guide has one end fixed to the movable plane and has the other end supported on the stationary plane by a roller to permit free movement of that end of the guide with respect to the stationary plane.

6. A press according to claim 1 wherein the brush is mounted for rotation on an axis which is disposed at right angles to both the direction of the horizontal displacement and the direction of the vertical displacement.

* * * * *